Inventor:
Ludwig MAURER
BY: Arthur O. Klein
Attorney

Fig. 2

United States Patent Office 3,609,971
Patented Oct. 5, 1971

3,609,971
METHOD AND APPARATUS FOR CONTROLLING THE DRIVE OF PRESSURE-FLUID ACTUATED MACHINE ELEMENTS
Ludwig Maurer, Emmendingen, Baden, Germany, assignor to Firma Ludwig Maurer & Co., Zug, Switzerland
Filed Feb. 25, 1969, Ser. No. 802,129
Claims priority, application Germany, Feb. 27, 1968, P 16 50 785.0
Int. Cl. F15b 15/18
U.S. Cl. 60—52 VS
13 Claims

ABSTRACT OF THE DISCLOSURE

A method and apparatus for controlling the operation of machine elements driven by a fluid under pressure. A pump controls the flow of fluid under pressure and is itself adjuted by a valve-controlled adjusting unit. The latter unit includes an electrically operable valve connected into an electrical circuit which includes primary control and at least one secondary control connected in series with the primary control and connected electrically with this unit for controlling the latter. Reference and actual values of a primary control parameter are transmitted by suitable signal transmitter devices to the primary control while an actual value of a second parameter is transmitted to the secondary control there to be combined with the output of the primary control. In addition a signal transmitter for transmitting a reference value signal of the second parameter is provided, and this latter reference value is connected into the circuit by a limit switch connected to the output of the primary control so as to be combined with this output before it reaches the secondary control.

BACKGROUND OF THE INVENTION

The present invention relates to a method and apparatus for controlling the drive of fluid-pressure actuated machine elements.

Thus, the present invention may be used for controlling the operation of working cylinders of machies such as injection or blow molding machines.

Up to the present time, hydraulic drives used for machines of this type have been controlled with relatively few exceptions by way of pumps the output volume of which could not be regulated. The control of the pressure and speed of movement could only take place by way of hydraulic valves for volume control devices, and the use of devices of this latter type has always resulted in a very large fraction of lost energy. Devices of this type furthermore require that reverse-flow coolers be included, so as to assure an operation where the temperature of the particular work medium does not increase beyond a value which is safe for the particular operations. The inclusion of such cooling units results in an extremely expensive operating cost and thus increases to an even higher degree the costs which result from the poor operating efficiency.

There are known machines which operate with pressure-compensating control pumps. Installations of this latter type do indeed provide a certain saving, since only that volume of working oil which is required is supplied. However, with machines of this type the speed of movement of the controlled machine elements and the required operating pressure can only be regulated through flow-control valves and pressure-reducing valves, so that these latter devices again have the result of an undesirably large loss of energy.

SUMMARY OF THE INVENTION

It is accordingly a primary object of the present invention to provide a method and apparatus which will avoid the above drawbacks.

In particular, it is an object of the invention to reduce the energy loss previously encountered in the operation of the machine elements so as to achieve the highest possible operating efficiency.

Furthermore, it is an object of the invention to provide a fully automatic control system which preferably is electronic, and which results in a control of the machine elements of far greater precision than has heretofore been possible.

Thus, it is an object of the invention to provide a method and apparatus which will result in a very substantial improvement in the quality of the products which are achieved with the controlled machine elements, so that injection molded products, for example, will have their quality improved when the invention is applied to injection molding machines, for example.

Yet another object of the invention is to provide a method and apparatus which will greatly widen the possible range of use of machines of this type as a result of the fully electronic control system.

With a method and apparatus of the invention the energy loss encountered when controlling the machine elements is extremely small and is on the order of only a small fraction of the losses previously encountered with known machines. Cooling of the pressure-fluid medium is no longer required, since the very small amount of heat which is generated with the method and apparatus of the invention is easily compensated as a result of the thermal communication of the supply reservoir with the outer atmosphere. As a result, very substantial reductions in operating costs can be achieved with the method and apparatus of the invention, and the fully electronically controlled machine is actually of much greater economic advantage than previously known machines of this type even though there is an initial high first cost when setting up the machine and method of the invention.

According to the invention various control parameters, such as the location of moving parts, the speed of movement thereof, the pressure, the number of revolutions, and the like, are transmitted to an adjusting means which through an electrically operable control valve adjusts a pump means wich in turn controls the machine elements in accordance with the particular values of the control parameters which bring about the adjustment of the pump. Thus, by way of the adjustment of the pump means the amount and direction of flow of the pressure fluid and the operating pressure thereof can be regulated in accordance with preselected reference values.

In order to connect these control parameters into a suitable electrical control circuit, the invention includes a primary control circuit portion having a primary control means which receives a reference signal from a reference signal transmitter of the primary control parameter as well as an actual value signal from an actual value transmitter of the primary control parameter, so that the difference between the reference and actual values of the primary control parameter is impressed upon the primary control means. Connected in series with the latter is at least one secondary control means which also has a signal transmitter for transmitting thereto the actual value of a second parameter to be combined with the output of the primary control means at the secondary control means. Also, a secondary signal transmitter means is provided for transmitting a singal of the reference value of the second parameter, and through a limit switch means, for example, a diode and a resistor, this reference value of the second parameter is combined with the output of the primary control means before the latter output reaches the secondary control means. In order to provide controls with more than two parameters, it is possible to include in the circuit additional secondary controls to be combined with the primary controls and the secondary control referred to above. Thus, by corresponding setting of the reference values of the selected parameters and by providing suitable electrical circuitry, it is possible to provide the predetermined reference value magnitudes in different ways during the adjusting operations of the drive elements which are to be controlled so that the controls for the individual parameters can be brought into operation in different ways with the regulation of the individual control parameters also being brought about automatically.

BRIEF DESCRIPTION OF DRAWINGS

The invention is illustrated by way of example in the accompanying drawings which form part of this application and in which:

FIG. 2 is a block diagram showing the electrical control circuit for controlling a hydrostatic or hydrodynamic drive.

DESCRIPTION OF PREFERRED EMBODIMENTS

Figure 1:
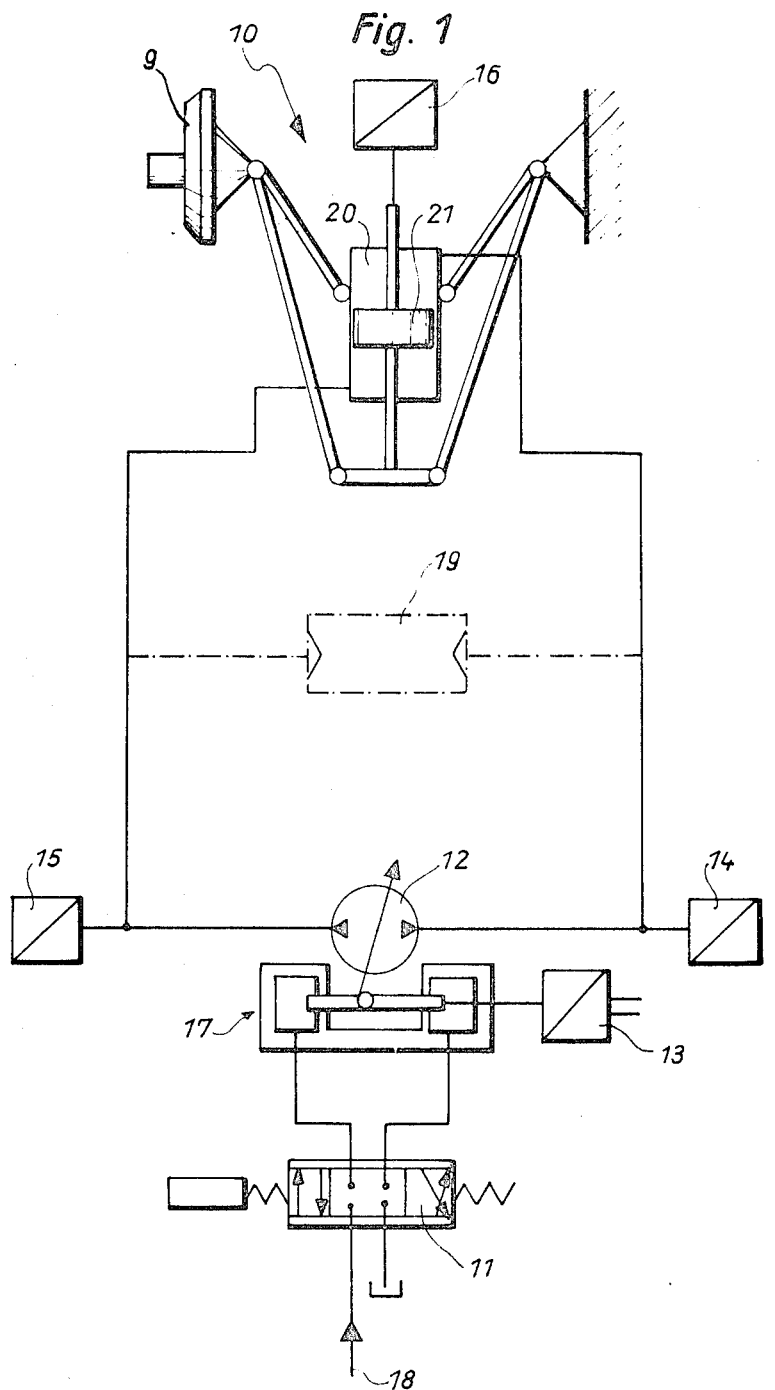
FIG. 1 is a schematic representation of a hydrostatic drive for controlling a toggle-linkage system of a unit which closes a mold chamber of an injection molding machine.

Referring to FIG. 1 it will be seen that the drive unit for the toggle-linkage system which actuates the mold closing unit is indicated in its entirety by the reference character 10 and includes a cylinder 20 in which a piston 21 is guided. As a result of the control method and apparatus of the invention referred to below the path of movement or position, the speed of movement, and the pressure are all regulated. The controlled values act upon an adjusting means 17 which adjusts the pump means 12, and a valve means in the form of servo-valve 11 which is electrically operable is connected ahead of the adjusting means 17 and pump means 12. This electrically operable control valve means 11 serves to bring about an adjustment of an adjustable unit of the pump means, and in a known way this pump means can in this way be adjusted to control the amount of pressure fluid delivered, the direction of flow of the pressure fluid, and the operating pressure of the pressure fluid. An adjustment signal transmitter 13 is operatively connected to the adjusting means 17 and serves to transmit to the control circuit of FIG. 2 an actual signal of the position of the operating adjustment of the pump means. The pair of additional symmetrically arranged signal transmitter means 14 and 15 come alternately into operation with forward and reverse running of the hydrostatic drive to which the working fluid under pressure is delivered. These transmitter means 14 and 15 transmit the prevailing fluid pressure to the control circuit. The signal transmitter means 16 which is operatively connected with the piston 21 transmits a signal of the position of the operating piston 21 to the control circuit. In a central position of the adjusting means 17 the operating piston 21 is held stationary in the particular position it happens to be located in. The pressure control fluid is supplied through suitable piping 18.

In the case of machines which have cycles rapidly following one after the other, it may be necessary to renew the fluid medium which is used in the hydrostatic drive in order to avoid an undesirably high degree of impurities in the operating fluid as well as to avoid a heating thereof which is too intense. For this type of operation a cleaning or flushing assembly 19 is built into the hydrostatic drive, as shown in dot-dash lines in FIG. 1. This unit 19 takes care of renewing the fluid medium without any undesirable influence on the hydrostatic or hydrodynamic drive.

In the particular example of an injection molding machine, a blow molding machine, or a combined injection and blow molding machine, as disclosed in this application, all operating movements of the machine can be controlled as will be apparent from FIG. 1 and FIG. 2 described below. When using a hydromotor, it is possible in the same way to control the speed of revolution of the worm drive of the injection molding machine as well as the maximum turning moment of the worm. When the installation has individual actuating components it may be desirable to use a hydrodynamic drive rather than the hydrostatic drive shown in FIG. 1. This is particularly the case when, because of the particular construction, the piston surfaces against which the fluid under pressure is applied do not have the same areas, as is the case, for example, with the injection cylinder of an injection molding machine. With such an injection cylinder operatively connected with the hydrodynamic drive it becomes possible to reinforce the output of the worm of the worm supply device by the hydraulic application of the fluid under pressure to the piston. Such an installation may in particular be required when the worm and injection piston are designed for extremely high injection pressures and when the surface area ratio between the worm and injection piston is very unfavorable with respect to overcoming the force of friction of the injection piston since the built-up pressure is undesirably high as a result of the inherent friction of the piston even when there is no preliminary stressing of the oil return flow.

Figure 2:
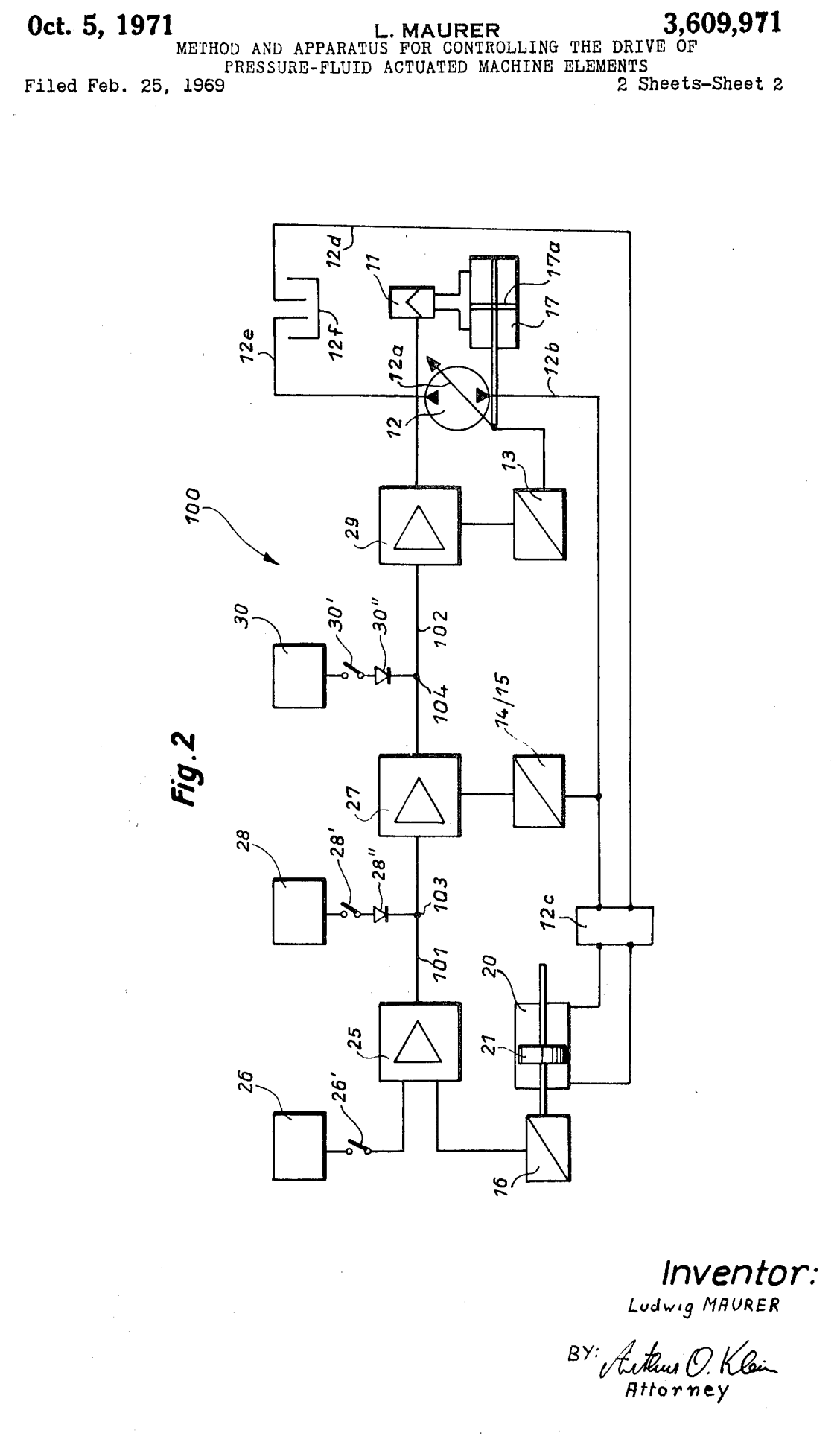

Referring now to the block diagram of FIG. 2, there is illustrated therein a control system which includes the control pump means 12 which is adjustable and which can be adjusted by an adjusting means in the form of an adjusting motor 17. This adusting motor 17 is supplied with oil under pressure through the adjustable servo-valve means 11 by way of an unillustrated pump from an also unillustrated supply tank with the oil under pressure being selectively delivered either to the left or right cylinder chamber so as to act on the adjusting means 17 for adjusting the pump means 12. This control pump means 12 will supply an amount of pressure fluid and a pressure for the fluid both of which are proportional to the location of the adjusting component 12a of the pump means 12, as schematically represented in FIG. 2. The control pump means 12 is connected, through suitable conduits and a four-way control valve 12c, with the left or right side of the piston 21 in the cylinder 20, the fluid under pressure flowing from the pump means 12 through the pressure conduit 12b and the valve 12c to one or the other side of the piston 21. That one of the chambers of the cylinder 20 which does not receive the fluid under pressure from the conduit 12b and the valve 12c is connected through the latter valve to the return flow conduit 12d which returns the low-pressure fluid to the supply tank 12f from which the fluid is sucked through the suction inlet conduit 12e communicating with the suction side of the pump 12. Thus, both the suction conduit 12e and the return flow conduit 12b communicate with the supply tank 12f.

The piston 21 of the operating cylinder 20 forms a machine element which is actuated by fluid under pressure, and the adjustment of the piston 21 is brought about by way of the control system 100 schematically represented in FIG. 2. In the preferred example of the invention which is illustrated in FIG. 2 there are three control parameters which determine the adjustments, these three parameters being a position or location parameter, preferably at least one end position of the piston 21, the speed of movement of the piston, and the pressure of the hydraulic fluid in the pressure conduit 12b which flows through the reversing valve 12c, in the form of a four-way valve, with practically undiminished magnitude into the cylinder chamber into which the pressure of the pressure fluid travels. For this purpose the control system has an electrical control circuit having a primary circuit portion where a primary control means 25 is located. A signal transmitter means 16, already referred to above, serves to transmit to the primary control means 25 a value indicating the actual position of the piston 21, this latter parameter being the primary control parameter in this case. A reference signal transmitter means 26 is operatively connected with the primary control means 25 for transmitting a reference value of the location of the piston 21, so that the desired signal indicating the desired position of the piston 21 is introduced into the control means 25 by way of the signal transmitter means 26. Thus, the output signal of the primary control means 25 will be transmitted directly to the servo-valve means 11 to provide in this way a control of the adjusting means 17, in the case where the additional control units 13, 14, 28, and 30, referred to below, are in an inoperative position where they do not participate in the operations.

However, in accordance with the invention in the illustrated example, at least one secondary control means 27 is connected in series with the primary control means 25, and in fact a second secondary control means 29 is connected in series with this one secondary control means 27. The secondary control means 27 is provided with a means 14, 15 for transmitting a signal of the actual value of a second parameter to the control means 27. In this case this second parameter is the pressure of the fluid in the pressure conduit 12b, so that the output signal of the signal transmitter means 14, 15, is a signal proportional to this latter pressure. In addition, there is a signal transmitter means 28 to provide, for the secondary control means 27, a signal of the desired or reference value of this pressure in the conduit 12b, so that the reference value of the second parameter of control means 27 is derived from the signal transmitter means 28.

The second secondary control means 29 is provided with an actual value signal transmitter means 13 the output signal of which is proportional to the speed of adjusting movement of the piston 17a of the adjusting motor 17, so that the third parameter, of the second secondary control means 29, is this speed of adjusting movement of the piston 17a. In addition the secondary control means 29 is provided with a reference value signal transmitter means 30 which transmits a signal proportional to the desired or reference value of the speed of movement of the piston 17a.

With these arrangements during actual control operations there will always be, as is customary, the difference between the reference value signals and their corresponding actual value signals, which differences will actually form the inputs into the secondary control means 27 and 29, so that actually the signals delivered thereto represent the difference between the desired or reference signal values and the actual signal values. In accordance with the invention the signal differences of the pair of transmitter means 14, 28, or 13, 30 are electrically connected to the outputs of the previous controls before the latter outputs reach the next controls. In other words, the output of signal transmitting means 28 is electrically connected with the output of control means 25 before the latter output reaches the next control means 27, and the output of signal transmitting means 30 is combined with the output of the secondary control means 27 before this latter output reaches the second secondary control means 29. The outputs of the signal transmitting means 14, 15 and 13 are combined at the control means 27 and 29, respectively, with the outputs from the previous control means respectively received thereby. All of the illustrated controls 25, 27, and 29 are in a preferred embodiment in the form of proportional controls. Each reference signal transmitter means 26, 28, 30 can be placed out of operation by way of a switch 26′, 28′, and 30′, respectively by utilizing an unillustrated automatic or manual device for controlling these switches. On the other hand, the actual value signal transmitters 13, 14–15, and 16 provide outputs which are permanently connected electrically with and transmitted to the corresponding control means. The outputs of the reference value transmitters 28 and 30 are electrically connected through limiting switch means 28″ and 30″ to the electrical conductors 101 and 102, respectively, between the pair of control means 25, 27 in the case of transmitter 28 and between the control means 27 and 29 in the case of transmitter 30, the junctions 103 and 104 being provided at the connections between the conductors. In the illustrated examples, the limiting switch means takes the form in each case of a diode and a resistance. The above-described control system operates in the following manner:

It is assumed that the controls serve for the closing and opening of an injection mold of an injection molding machine, as illustrated schematically in FIG. 1. In this case there is a movable mold closing and opening plate 9 which actually forms one-half of an injection mold. As is apparent from the example illustrated in FIG. 1, a toggle-linkage system is operatively connected in the manner schematically shown with the operating cylinder 20 to bring about the required movement of the machine element 9. The switches 26′, 28′, and 30′ are assumed to be closed during the control operations described below. It is also assumed that at the start of the operations the mold is in its fully opened position.

The reference value signal transmitter means 26 applies a reference value signal in the form of a predetermined adjusted voltage selected in such a way that the actual value signal transmitted by the actual value signal transmitter means 16 is not fully compensated even in the position where the component 9 fully closes the mold. In the open position of the mold, the input of the control means 25 corresponds to a maximum differential between the reference and actual value signals, and this maximum differential may be on the order of 10 volts. This differential gradually becomes smaller in a manner proportional to the closing movement brought about by movement of piston 21, and this differential between the reference and actual signal values achieves its smallest value in the closed position of the mold when the toggle joint linkage is in its extended, dead-center position, but even at this time the differential is not equal to zero.

As long as the output voltage of the control means 25 exceeds the predetermined limiting voltage determined by the reference signal transmitter means 28 and the diode 28″ operatively connected therewith, there will be at the junction 103 a voltage equal to the sum of the reference value voltage of the signal transmitter 28 plus the through-voltage of the diode 28″. The voltage thus reaching the junction 103 is then compared at the input of the secondary control means 27 with the actual value voltage signal delivered to the secondary control means 27 by the actual value signal transmitting means 14, 15, and in this way a corresponding control differential will be formed which has a magnitude determining the output of the control means 27.

Corresponding operations take place at the junction 104 inasmuch as the voltage at this junction always corresponds essentially to the voltage supplied by the reference value signal transmitter means 30, in the case when this latter voltage is of a magnitude smaller than the output voltage of the control means 27. Thus, if it is assumed that the output voltage of the control means 27 is greater than the adjusted limiting voltage determined by the limiting switch means 30″, then at the input of the second secondary control means 29 there will be practically a voltage corresponding only to the reference value of the reference value signal transmitter means 30. The input of the control means 29 is furthermore impressed with the actual value signal derived from the actual value signal transmitter means 13 which is used to form, with the signal at the conductor 102, the differential between the actual and reference values. The output of the control means 29 adjusts the electrical servo-valve means 11 which is in the form of a magnet valve and which serves to control the piston 17a in such a way that the control differential provided by the output of the control means 29 always tends to be reduced toward a minimum. In other words the controls are always brought about in such a way that the differentials are constantly becoming of smaller values.

As is apparent from the above description, it is possible by corresponding settings of the reference values for the signal transmitting means 26, 28, and 30 as well as, in some cases, through the structures of further electronic components such as voltage dividers, or the like, to provide an operation according to which the reference value signals provided by the units 26, 28 and 30 alternate in a predetermined manner during the adjusting movement of the piston 21 so that all three of the parameters which influence the controlled movement of the piston 21 can come in a predetermined manner differently into operation during the controlled movement of the piston 21.

During closing of the mold by the component 9 it is in general desired to displace the piston 21 initially from the fully open position at a relatively high speed with a corresponding high hydraulic pressure in the conduit 12b until the component 9 reaches the region of its end closing position, whereupon the speed of movement of the piston should be smoothly reduced to a relatively slow movement to achieve a practically impact-free closing of the mold, with a predetermined closing pressure also being produced in a controllable manner. In this case, the illustrated circuitry is set up in such a way that during the closing movement of the piston 21 throughout the greatest part of its movement, beginning with the open position of the mold component 9, the limiting voltage at the junction 104, which corresponds essentially to the voltage of the refrence value transmitter 30, is adjusted in such a way that the output of the control means 27 is of a voltage greater than the limiting voltage. Then there will be at the junction 104 practically a voltage which corresponds to the reference speed of movement value, so that the differential impressed upon the control means 29 corresponds essentially only to speed of movement controlled differential and the speed of movement is controlled in accordance with the value determined by the reference value transmitter means 30.

When the mold component 9 has reached the region of its closed position, the reference value of the reference value transmitter 28, which is to say the pressure reference value, is lowered from the initial relatively high value to a lower reference value. This reduction preferably takes place in accordance with the movement and location of the piston 21 so that it is the position of the latter which provides a positioning signal which adjusts the reference value to such a magnitude that at the output of the control means 27 there is a potential acting in the blocking direction of the diode 30″. In this way the reference value signal of the signal transmitting means 30 is no longer received at the junction 104, insofar as the speed of movement reference value has not been adjusted to an extremely low value. Thus, when the piston 21 reaches this position, only the pressure in the conduit 12b is regulated and the value of this pressure is adjusted so as to correspond approximately to the reduced reference value of the pressure reference value transmitter means 28. The piston 21 then moves further at a slower speed as a result of the reduced pressure acting on the piston 21, until the component 9 reaches its fully closed position, whereupon this pressure (mold closing safety pressure) is maintained in the closed position of the mold. The reference value signal transmitter 26 is thus adjusted in such a way that at the output of the control means 25 there is a permanent control differential by means of which the limiting switch means 28″ remains unblocked even in the closed position of the mold.

As is apparent from the above description, in this preferred embodiment of the invention upon closing of the mold the reference value signal transmitting means 26 and actual value signal transmitting means 16 practically serve only during the entire closing movement of the piston 21 to unblock the limiting switch means 28″, so that the reference value signal transmitter 28 remains effective.

Thus, it is apparent that, if desired, it is possible during the above-described control operations to maintain the switches 28′ or 30′ open so that in this way during the entire adjusting movement there will only be either a control according to speed or a control according to pressure. However, it is of particular advantage to provide the combined speed and pressure controls.

In order to open the mold the reference values of the reference signal transmitter means 26, 28, and 30 are automatically adjusted to different magnitudes, so that a predetermined opening movement is provided by way of the piston 21 and the piston then remains in the predetermined open position. Preferably the opening movement by way of the illustrated control system is brought about in the following manner:

Inasmuch as a relatively low pressure in the conduit 12b will suffice for the opening movement of the mold component 9, with no requirement of controlling this relatively low pressure, the reference value transmitting means 28 is rendered inoperative by opening of the switch 28′ or is set to such a value that the limiting switch means 28″ remains permanently blocked during the opening operations. During the entire opening operations it is preferred to provide essentially only a control of the speed of movement. For this purpose the amplification factors of the pair of control means 25 and 27 are such that the limiting switch means 30″ is unblocked shortly before reaching of the open position so that the reference value transmitter means 30, whose reference value is, if desired, adjustable depending upon the adjusting movement in a suitable automatic manner, becomes effective practically by itself for the controls. The reference value transmitter means 26 is adjusted in such a way that at the input of the control means 25 there is an adjusting control differential which reaches zero when the desired open position is reached. As a result, the output voltage of the control means 25 becomes gradually smaller so that also the output of the control means 27, shortly before reaching of the open position, has a value by means of which the limiting switch means 30″ is blocked so that the movement of the piston 21 into the open position at the last part of the adjusting movement is determined only by the adjusting control differential present at the control means 25, and a smooth movement into the open position, up until the end stationary position is reached, is achieved. The non-linearity of the characteristic operating curve of the diode 30″ thus contributes a highly favorable effect to the smoothness of the adjusting movement.

It is of course understood that the control system shown in FIG. 2 also can be provided advantageously for other purposes such as for ejecting an injection molded component out of the mold or to control the rotary movement of a worm or screw of the injection cylinder, or the like. It is apparent that in this way it becomes possible with the new method and apparatus of the invention to control the position and adjusting movement of the piston 21 of the operating cylinder 20 in accordance with a pluraliy of parameters in any desired manner in such a way that during the particular adjusting movement there will be a partial control primarily depending upon speed of movement and/or a partial control depending upon pressure and/or a partial control depending upon position or location, so that the influence of these different parameters can, if desired, be mixed together.

Also, the effects derived from these parameters can be provided independently of each other to achieve essentially sequential controls from the several parameters, respectively. This type of operation is brought about by having a permanent transmission of the actual values of the individual actual value signal transmitter means and thus to bring about a favorable operation on the control process. The permanent connection of the actual values into the circuit, particularly the actual values derived from the transmitting means 13 and 14, results in a particularly fast control operation.

The illustrated control system can be varied in many different ways and permits a large number of widely different forms of controls to be achieved. For example each reference value signal transmitter can have a pair of outputs which are connected by way of diodes, which are connected in opposition to each other, to the primary conductors such as the conductors 101 and 102. Thus, in one direction of movement of the piston 21 it is possible for one of these outputs of each reference value signal transmitter to be applied to the control system while in the opposite direction of movement of the piston 21 only the other opposed output of the particular reference value transmitter will be introduced into the circuit with opposed polarity. Thus it becomes possible to achieve predetermined different adjusting movements in the different adjusting directions.

Individual components of the above-described control system can be made up of suitable known elements, which are preferably electronic, pneumatic, electrical, or electromechanical elements.

What is claimed is:

1. In a device for controlling the operation of pressure-fluid actuated machine elements in accordance with given parameters, adjustable pump means for controlling the operation of the machine elements with a given pressure-fluid, adjusting means coacting with said pump means for adjusting the latter, electrically-operable valve means coacting with said adjusting means for adjusting the latter, an electrical circuit in which said valve means is located, said electrical circuit having a primary control circuit portion provided with an actual value signal transmitter means for transmitting an actual value of a primary parameter and with a reference value signal transmitter means for transmitting a reference value of the primary parameter, and said primary electrical circuit portion including a primary control means for receiving a signal corresponding to the difference between the signals of the actual and reference values of the primary parameter, at least one secondary control means connected in series with said primary control means and operatively connected to said valve means for controlling the latter, said secondary control means receiving an output of said primary control means, an actual value signal transmitter means operatively connected with said secondary control means for transmitting thereto a signal of an actual value of a second parameter which is combined with the output of the primary control means, reference value signal transmitter means for transmitting a signal of a reference value of the second parameter, and limit switch means electrically interconnecting said latter reference value signal transmitter means for the second parameter with the output of said primary control means before transmitting the signal of the reference value of the second parameter to said secondary control means.

2. The combination of claim 1 and wherein at least a second secondary control means is connected in series with said one secondary control means for providing a control according to a third parameter, actual value signal transmitter means operatively connected with said second secondary control means for transmitting thereto an actual value signal of the third parameter to be combined with the output of said one secondary control means received by said second secondary control means, a reference value signal transmitter means for transmitting a signal of a reference value of the third parameter, and second limit switch means electrically connected with the latter transmitter means and with the output of said one secondary control means for adding to the latter the reference value signal of the third parameter before the output of said one secondary control means is received by said second secondary control means.

3. The combination of claim 1 and wherein said primary control means produces an output acting in a direction tending to unblock the limiting switch means and tending to block said limiting switch means in a range extending from a predetermined relatively small output value.

4. The combination of claim 2 and wherein the output of said one secondary control means tends to unblock the second limit switch means while tending to block the latter in a range from a predetermined relatively small output magnitude of said one secondary control means.

5. The combination of claim 1 and including at least one reference value signal transmitter means connected to the circuit for providing reference value signals of opposed polarities, respectively, to achieve forward and reverse operation of the controlled machine elements.

6. The combination of claim 5 and wherein said reference value signal transmitter means is the means which transmits the reference value signal of the primary parameter to the primary control means.

7. The combination of claim 1 and wherein both reference value signal transmitter means are reversible to transmit to both control means, respectively, reference value signals of different polarities, respectively.

8. The combination of claim 1 and wherein at least one of said means for transmitting a reference value signal is automatically adjustable to provide signals of different reference values depending upon the location of the controlled machine elements.

9. The combination of claim 1 and wherein a hydrodynamic drive means is operatively connected to the machine elements for controlling the latter and wherein a hydromotor means provides the controls of the machine elements.

10. The combination of claim 1 and wherein a pair of pressure transmitter means are operatively connected with said pump means and form an actual value signal transmitter means for transmitting a signal of actual pressure to the control circuit to bring about, respectively, forward and reverse operation of the drive means.

11. In a device for controlling the operation of pressure-fluid actuated machine elements in accordance with given parameters, adjustable pump means for controlling the operation of the machine elements with a given pressure-fluid, adjusting means coacting with said pump means for adjusting the latter, a control circuit to which said adjusting means is connected, said circuit having a primary control circuit portion provided with an actual value signal transmitter means for transmitting an actual value of a primary parameter and with a reference value signal transmitter means for transmitting a reference value of the primary parameter, and said primary circuit portion including a primary control means for receiving a signal corresponding to the difference between the signals of the actual and reference values of the primary parameter, at least one secondary control means connected in series with said primary control means and operatively connected to said adjusting means for controlling the latter, said secondary control means receiving an output of said primary control means, an actual value signal transmitter means operatively connected with said secondary control means for transmitting thereto a signal of an actual value of a second parameter which is combined with the output of the primary control means, and reference value signal transmitter means for transmitting a signal of a reference value of the second parameter.

12. The combination of claim 11, wherein the adjusting means includes an electrically-operable means, and the control circuit is an electrical circuit.

13. The combination of claim 11, comprising limit means interconnecting said latter reference value signal transmitter means for the second parameter with the output of said primary control means before transmitting the signal of the reference value of the second parameter to said secondary control means.

References Cited

UNITED STATES PATENTS

| | | | |
|---|---|---|---|
| 1,974,138 | 9/1934 | Ferris et al. | 60—52 VSP X |
| 1,986,640 | 1/1935 | Lamond | 60—52 VSP X |
| 2,238,061 | 4/1941 | Kendrick | 60—52 VSP X |
| 2,977,765 | 4/1961 | Fillmore | 60—52 VSP X |

EDGAR W. GEOGHEGAN, Primary Examiner

U.S. Cl. X.R.

60—DIGEST 2